US012771215B2

(12) United States Patent
Kobayashi et al.

(10) Patent No.: US 12,771,215 B2
(45) Date of Patent: Oct. 20, 2026

(54) ELECTRIC COMPRESSOR

(71) Applicant: SANDEN CORPORATION, Gunma (JP)

(72) Inventors: Mikio Kobayashi, Gunma (JP); Kazuya Iizuka, Gunma (JP)

(73) Assignee: SANDEN CORPORATION, Gunma (JP)

( * ) Notice: Subject to any disclaimer, the term of this patent is extended or adjusted under 35 U.S.C. 154(b) by 171 days.

(21) Appl. No.: 18/835,774

(22) PCT Filed: Jan. 24, 2023

(86) PCT No.: PCT/JP2023/002092
§ 371 (c)(1),
(2) Date: Aug. 5, 2024

(87) PCT Pub. No.: WO2023/157583
PCT Pub. Date: Aug. 24, 2023

(65) Prior Publication Data

US 2025/0132644 A1 Apr. 24, 2025

(30) Foreign Application Priority Data

Feb. 21, 2022 (JP) ................................ 2022-024782

(51) Int. Cl.
*H02K 11/33* (2016.01)
*F25B 31/02* (2006.01)

(52) U.S. Cl.
CPC .............. *H02K 11/33* (2016.01); *F25B 31/02* (2013.01); *H02K 2211/03* (2013.01)

(58) Field of Classification Search
CPC ......... H02K 11/33; F04B 35/04; F04B 39/00; F04B 49/06; F04B 39/121; F04B 39/14; F25B 31/02; H02M 7/003; H02M 1/327
See application file for complete search history.

(56) References Cited

U.S. PATENT DOCUMENTS 11,381,131 B2 * 7/2022 Kanazawa ............. H02K 5/225
2006/0108601 A1 5/2006 Okamoto
(Continued)

FOREIGN PATENT DOCUMENTS

JP 2006179856 A 7/2006
JP 2010275951 A 12/2010
JP 2014120549 A 6/2014

OTHER PUBLICATIONS

International Search Report mailed on Feb. 28, 2023 for PCT/JP2023/002092.

*Primary Examiner* — Leda T Pham
(74) *Attorney, Agent, or Firm* — Rankin, Hill & Clark LLP

(57) ABSTRACT

Provided is an electric compressor configured so that the assembly workability and electric insulation of a power switching element can be improved while the heat dissipation (cooling performance) of the power switching element is ensured. In the electric compressor, a housing that houses an electric motor and a compression mechanism and an inverter housing portion that houses an inverter including a plurality of power switching elements Q1 to Q6 are separated by a partitioning wall. The inverter housing portion has an installation portion on which the plurality of power switching elements Q1 to Q6 is installed. The plurality of power switching elements Q1 to Q6 is integrated using thermosetting insulating resin in a state in which at least part of the upper surface and the lower surface thereof are exposed, thereby forming a switching element module, and the switching element module is installed on the installation portion.

8 Claims, 9 Drawing Sheets

(56) References Cited

U.S. PATENT DOCUMENTS

| | | | | |
|---|---|---|---|---|
| 2012/0076679 | A1 * | 3/2012 | Saito | F04B 39/00<br>417/410.1 |
| 2021/0013782 | A1 * | 1/2021 | Kobayashi | F04B 39/121 |

* cited by examiner (a)

(b)

ELECTRIC COMPRESSOR

TECHNICAL FIELD

The present invention relates to an electric compressor integrally including an inverter.

BACKGROUND ART

Many electric compressors used for compressing refrigerant in, e.g., vehicle air conditioners integrally have inverters, and control power supply to electric motors that drive compression mechanisms while converting DC power from, e.g., in-vehicle batteries into AC power (drive the electric motors). One example of these electric compressors is described in Patent Literature 1. The electric compressor described in Patent Literature 1 has a compression mechanism, an electric motor, and an inverter in a housing, and the housing is partitioned by a partitioning wall into a space for housing the compression mechanism and the electric motor and a space for housing the inverter.

The inverter includes a plurality of power switching elements, and for these power switching elements, a temperature rise due to heat generation needs to be suppressed. In this regard, Patent Literature 1 describes that the plurality of power switching elements (power semiconductor elements) is arranged on the inverter-side surface of the partitioning wall so that the plurality of power switching elements can be cooled with sucked refrigerant through the partitioning wall.

CITATION LIST

Patent Literature

Patent Literature 1: JP-A-2010-275951

SUMMARY OF INVENTION

Problems to be Solved by Invention

However, in the above-described configuration, it is necessary to arrange the plurality of power switching elements one by one on the inverter-side surface of the partitioning wall, and there is still room for improvement in, e.g., assembly workability. In addition, in recent years, voltage applied to the power switching element has been increased, and there is still room for improvement in ensuring electric insulation.

An object of the present invention is to provide an electric compressor configured so that the assembly workability and electric insulation of a power switching element can be improved as compared to the related art while the heat dissipation (cooling performance) of the power switching element is ensured.

Solution to Problems

According to one aspect of the present invention, an electric compressor is provided. The electric compressor includes an electric motor, a compression mechanism driven by the electric motor to compress refrigerant, an inverter including a plurality of power switching elements that drives the electric motor, a housing that houses the compression mechanism and the electric motor, and an inverter housing portion that houses the inverter. The inside of the housing and the inside of the inverter housing portion are separated by a partitioning wall. In the electric compressor, the inverter housing portion has an installation portion on which the plurality of power switching elements is installed and which is provided on the surface of the partitioning wall on the inverter housing portion side. The plurality of power switching elements is integrated using thermosetting insulating resin in a state in which at least part of the upper surface and the lower surface of each power switching element are exposed to form a switching element module, and the switching element module is installed on the installation portion.

Effects of Invention

According to the present invention, the electric compressor can be provided, which is configured so that the assembly workability and electric insulation of the power switching element can be improved as compared to the related art while the heat dissipation (cooling performance) of the power switching element is ensured.

DESCRIPTION OF EMBODIMENTS

An embodiment of the present invention is described hereinafter with reference to the accompanying drawings.

Figure 1:
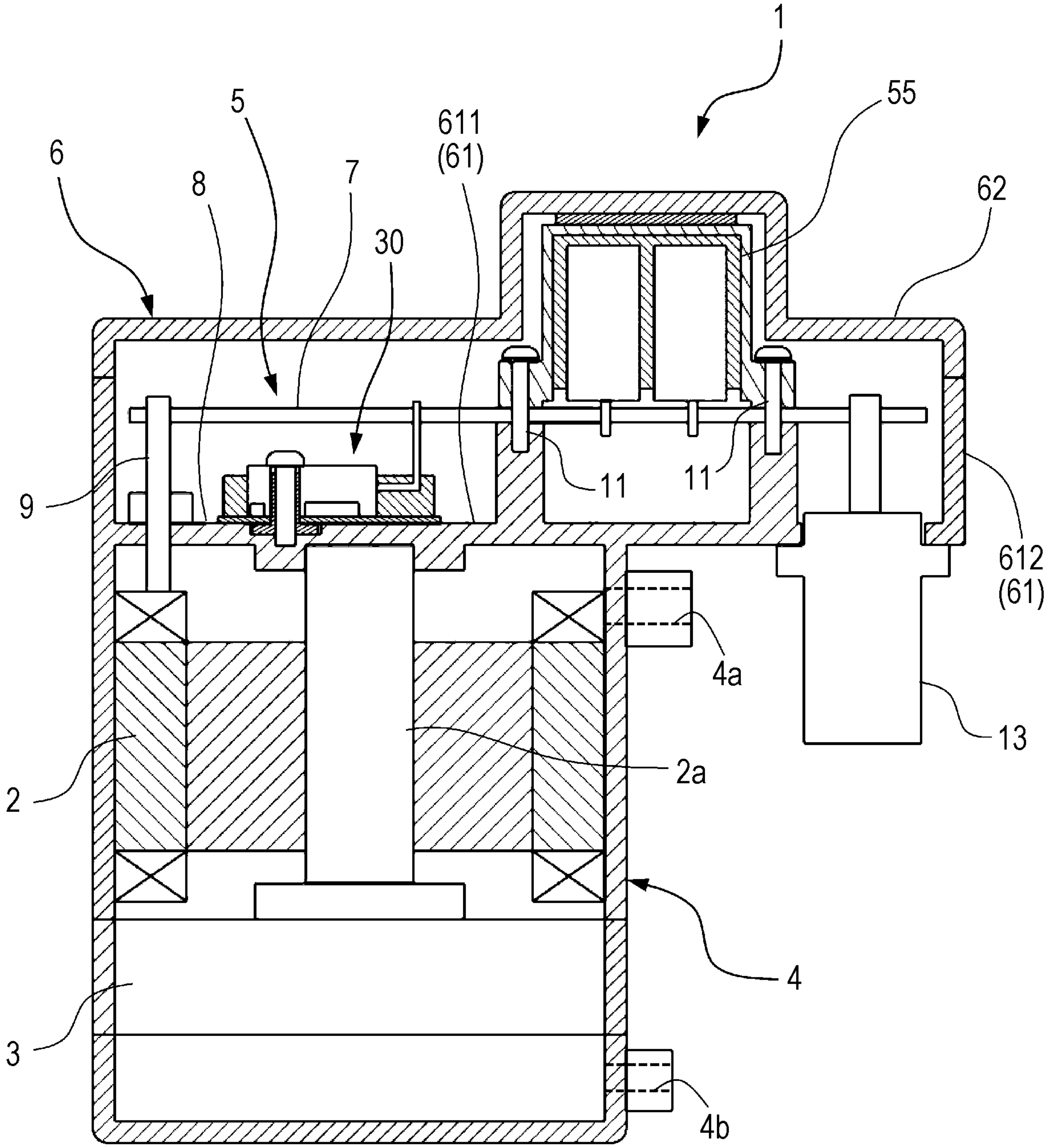
FIG. 1 is a schematic longitudinal sectional view of an electric compressor according to an embodiment.

FIG. 1 is a schematic longitudinal sectional view of an electric compressor 1 according to one embodiment of the present invention. The electric compressor 1 according to the embodiment is a so-called inverter-integrated electric compressor integrally having an inverter. For example, the electric compressor 1 may be mounted on a vehicle to form part of a refrigerant circuit of a vehicle air conditioner, and may be configured to compress and discharge refrigerant.

Referring to FIG. 1, the electric compressor 1 includes an electric motor 2, a compression mechanism 3 driven by the electric motor 2 to compress refrigerant, a housing 4 that houses the electric motor 2 and the compression mechanism 3, an inverter 5 that drives the electric motor 2, and an inverter housing portion 6 that houses the inverter 5.

The electric motor 2 is, for example, a three-phase synchronous motor (brushless DC motor). The compression mechanism 3 is, for example, a scroll compression mechanism. The electric motor 2 and the compression mechanism 3 are arranged in series in the axial direction of an output shaft 2*a* of the electric motor 2 in the housing 4. The output shaft 2*a* of the electric motor 2 is coupled to the compression mechanism 3 (orbiting scroll in the case of the scroll compression mechanism).

The inverter 5 includes various electronic components (described later) and a circuit board 7 on which these various electronic components are mounted. In other words, in the present embodiment, various electronic components are mounted on the circuit board 7 to form the inverter 5.

The inverter housing portion 6 is provided integrally with the housing 4. The inverter housing portion 6 is disposed on one end side of the housing 4 in the axial direction, specifically, on the opposite side of the electric motor 2 from the compression mechanism 3. In the present embodiment, the inverter housing portion 6 includes a housing body 61 formed integrally with the housing 4 and a cover member 62 detachable from the housing body 61.

The housing body 61 has a bottom wall 611 and a peripheral wall 612 standing from the peripheral edge of the bottom wall 611 and defining an opening facing the bottom wall 611. The cover member 62 is attached to the housing body 61 to close the opening. Part of the bottom wall 611 (which is also the bottom wall of the inverter housing portion 6) of the housing body 61 forms a partitioning wall 8 that separates the inside of the housing 4 and the inside of the inverter housing portion 6 from each other. Note that a power supply line 9 from the inverter 5 to the electric motor 2 extends through the partitioning wall 8 in an airtight and liquid-tight state.

Figure 2:
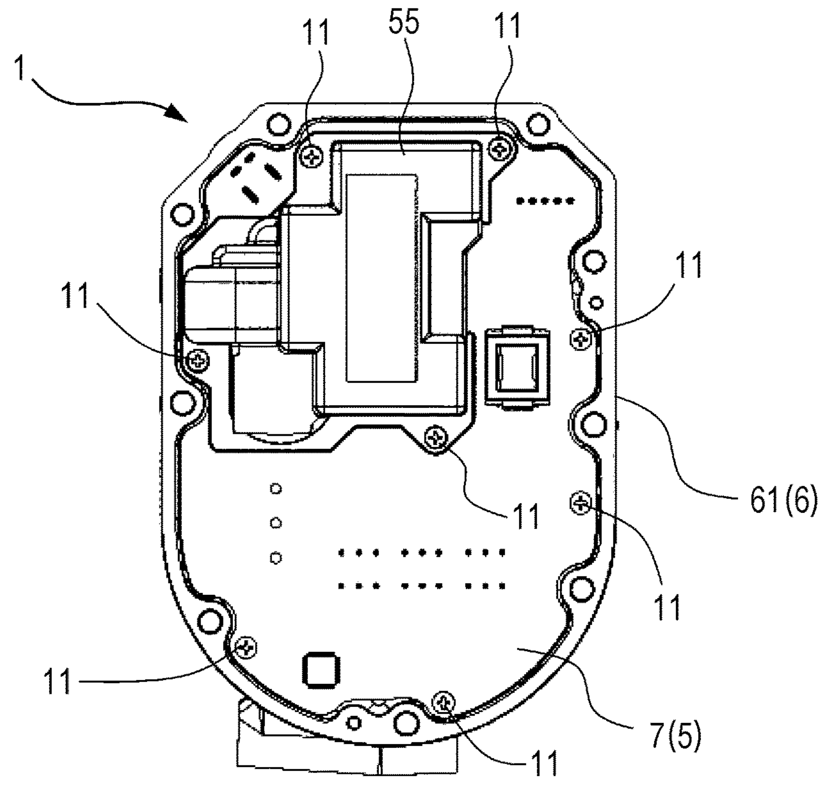
FIG. 2 is a view of the electric compressor according to the embodiment in a state in which a cover member of an inverter housing portion being detached as viewed from the inverter housing portion side.

FIG. 2 is a view of the electric compressor 1 in a state of the cover member 62 of the inverter housing portion 6 being detached as viewed from the inverter housing portion 6 side. As illustrated in FIG. 2, the circuit board 7 forming the inverter 5 is attached in the inverter housing portion 6 (housing body 61) with a plurality of first fixing bolts 11 (fixing members).

Returning to FIG. 1, a refrigerant inlet 4*a* through which refrigerant from the outside flows into the housing 4 is formed in a portion of the housing 4 on the partitioning wall 8 side. The refrigerant having flowed into the housing 4 flows in the housing 4 (gap in the electric motor 2) and reaches the compression mechanism 3, and the compression mechanism 3 is driven by the electric motor 2 to compress and discharge the refrigerant.

The refrigerant having flowed into the housing 4 is, for example, refrigerant having passed through, e.g., an expansion valve and an evaporator in the refrigerant circuit of the vehicle air conditioner, and is low-temperature low-pressure refrigerant. Thus, the partitioning wall 8 and the electric motor 2 can be cooled with the refrigerant having flowed into the housing 4 through the refrigerant inlet 4*a*. The refrigerant having flowed in the housing 4 is compressed into high-temperature high-pressure refrigerant by the compression mechanism 3, and is discharged from the compression mechanism 3. The (high-temperature high-pressure) refrigerant discharged from the compression mechanism 3 flows out through a refrigerant outlet 4*b* formed in the housing 4.

Figure 3:
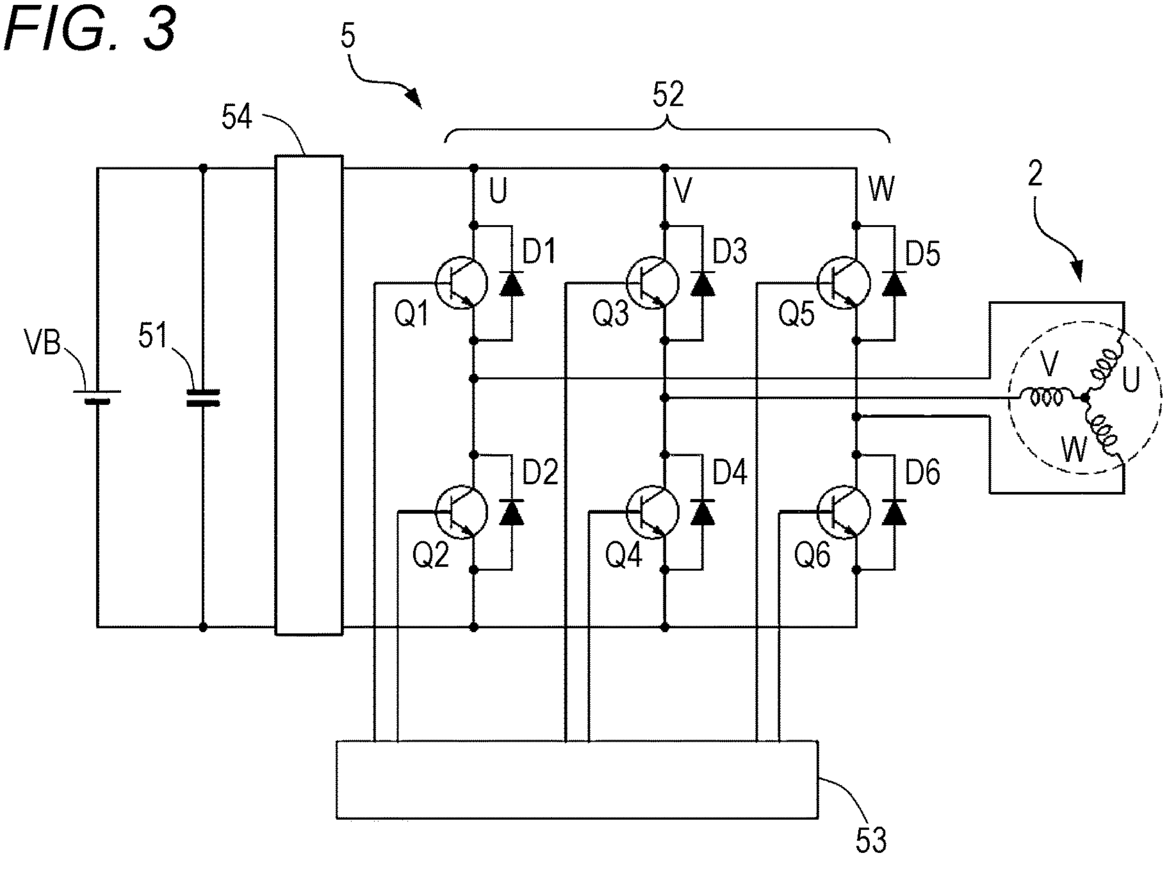
FIG. 3 is a diagram illustrating one example of a circuit configuration of an inverter of the electric compressor according to the embodiment.

Here, the inverter 5 will be briefly described. FIG. 3 is a diagram illustrating one example of a circuit configuration of the inverter 5. In the present embodiment, the inverter 5 is configured to convert DC power from an external power source (for example, in-vehicle battery) VB into three-phase AC power and supply the three-phase AC power to the electric motor 2.

As illustrated in FIG. 3, the inverter 5 includes a smoothing capacitor 51, a switching unit 52, a control circuit 53, and a noise filter 54. As described above, these components are mounted on the circuit board 7 to form the inverter 5.

The smoothing capacitor 51 is connected between a power line and a ground line of the external power source VB, and smooths DC voltage from the external power source VB.

The switching unit 52 includes six power switching elements Q1 to Q6 and six diodes D1 to D6. Although not particularly limited, the power switching elements Q1 to Q6 may be insulated gate bipolar transistors (IGBTs). The switching unit 52 is configured to convert the DC voltage smoothed by the smoothing capacitor 51 after having been supplied from the external power source VB into three-phase AC voltage and supply the three-phase AC voltage to the electric motor 2 by control (PMW control) of the power switching elements Q1 to Q6.

The switching unit 52 will be further described. The switching unit 52 has a U-phase arm, a V-phase arm, and a W-phase arm provided in parallel with each other between the power line and the ground line of the external power source VB.

Two power switching elements Q1, Q2 are connected in series to the U-phase arm, and the diodes D1, D2 are each connected in inverse parallel to the power switching elements Q1, Q2. Two power switching elements Q3, Q4 are connected in series to the V-phase arm, and the diodes D3, D4 are each connected in inverse parallel to the power switching elements Q3, Q4. Two power switching elements Q5, Q6 are connected in series to the W-phase arm, and the diodes D5, D6 are each connected in inverse parallel to the power switching elements Q5, Q6.

The midpoint of each of the U-, V-, and W-phase arms is connected to the other end of each of U-, V-, and W-phase coils of the electric motor 2 star-connected at one ends thereof. That is, the midpoint between the power switching elements Q1, Q2 of the U-phase arm is connected to the U-phase coil, the midpoint between the power switching elements Q3, Q4 of the V-phase arm is connected to the V-phase coil, and the midpoint between the power switching elements Q5, Q6 of the W-phase arm is connected to the W-phase coil.

By controlling a ratio between the ON period of the power line-side power switching element of each phase arm and the ON period of the ground line-side power switching element, i.e., by performing the PWM control on the plurality of power switching elements Q1 to Q6, the switching unit 52 can convert the DC power smoothed by the smoothing capacitor 51 after having supplied from the external power source VB into the three-phase AC power and supply the three-phase AC power to the electric motor 2, thereby driving the electric motor 2.

The control circuit 53 controls (PWM controls) the power switching elements Q1 to Q6 to drive the electric motor 2 and thus the compression mechanism 3 based on a control signal from the outside (for example, a control device for the vehicle air conditioner described above).

The noise filter 54 includes, e.g., a capacitor and a coil (inductor) (not illustrated). Although not particularly limited, in the present embodiment, the noise filter 54 is provided between the smoothing capacitor 51 and the switching unit 52, and mainly reduces, e.g., ripple noise and EMI/EMC noise due to operation of the power switching elements Q1 to Q6.

Next, a housing structure for the inverter 5 in the present embodiment will be described. As described above, in the present embodiment, the inverter 5 is housed in the inverter housing portion 6.

Inverter Housing Portion 6

Figure 4:
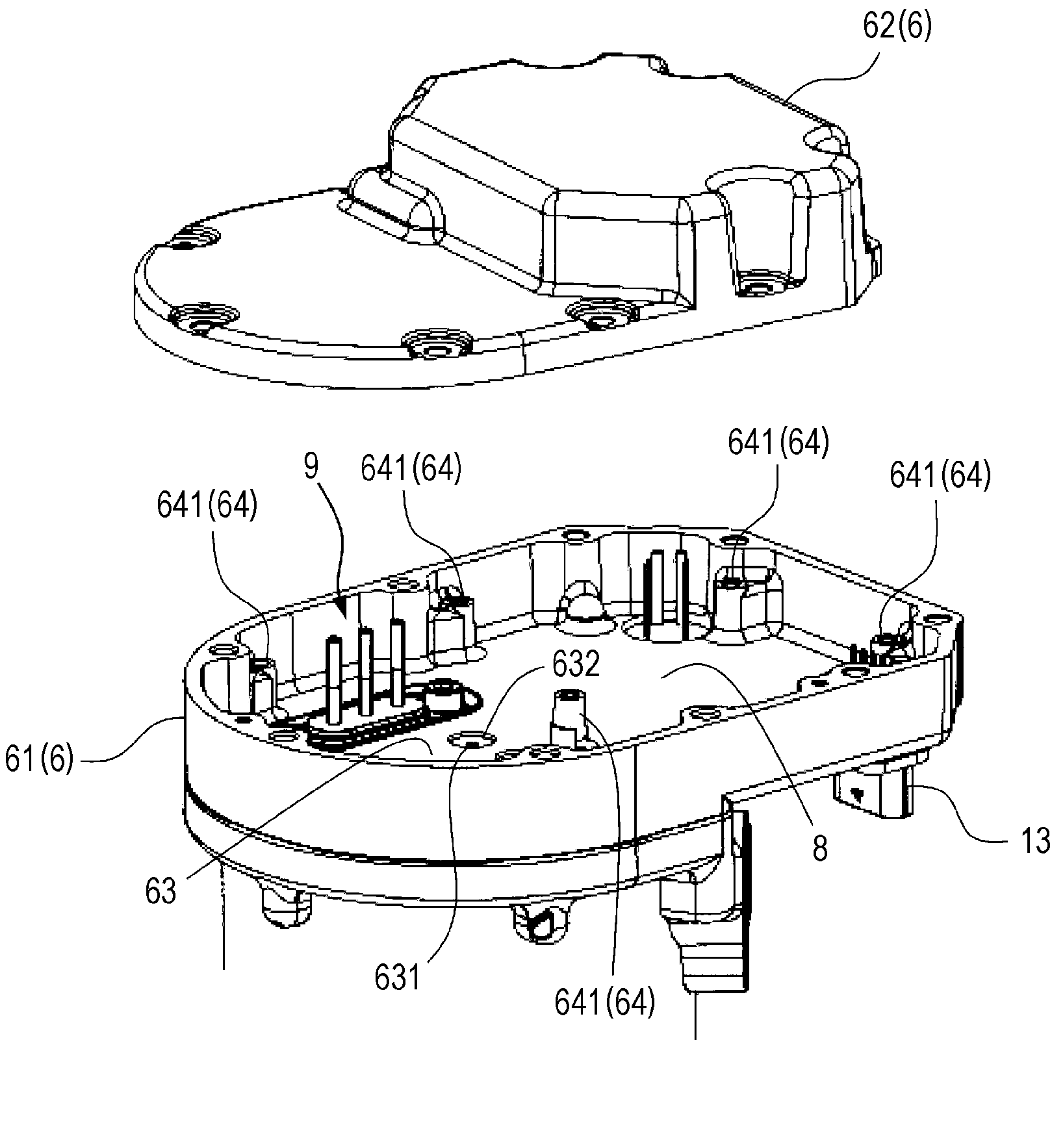
FIG. 4 is a view illustrating the inside of the inverter housing portion.

FIG. 4 is a view illustrating the inside of the inverter housing portion 6 (in a state in which the inverter 5 is not housed). As described above, the inverter housing portion 6 includes the housing body 61 and the cover member 62. Moreover, in the present embodiment, the inverter housing portion 6 includes an installation portion 63 on which the power switching elements Q1 to Q6 are installed, and a board support portion 64 that supports the circuit board 7 forming the inverter 5.

The installation portion 63 is provided on the inner bottom surface of the housing body 61, i.e., the surface of the partitioning wall 8 on the inverter housing portion 6 side. The installation portion 63 is only required to be provided on the surface of the partitioning wall 8 on the inverter housing portion 6 side. The installation portion 63 may be formed so as to protrude from the surface of the partitioning wall 8 on the inverter housing portion 6 side, may be formed so as to be recessed from the surface of the partitioning wall 8 on the inverter housing portion 6 side, or may be formed by arranging another member on the surface of the partitioning wall 8 on the inverter housing portion 6 side.

Although only one bolt hole is illustrated in FIG. 4, the installation portion 63 is formed with the same number of bolt holes 631 as the number of power switching elements Q1 to Q6 (i.e., six bolt holes 631), into which second fixing bolts 12 (see FIG. 5) as fixing members for fixing the power switching elements Q1 to Q6 are screwed, and counterbore portions 632 are each formed around the bolt holes 631. Most part of the installation portion 63 other than the bolt holes 631 and the counterbore portions 632 is formed as a flat surface. Note that the counterbore portion 632 houses a flange portion 412 of an insulating spacer 41 described later.

The board support portion 64 is configured to support the circuit board 7 at a position farther from the partitioning wall 8 (the surface thereof on the inverter housing portion 6 side) than the installation portion 63. That is, in the inverter housing portion 6, the circuit board 7 is disposed at a position closer to the cover member 62 than the power switching elements Q1 to Q6. In other words, when the cover member 62 side is an upper side and the partitioning wall 8 side is a lower side, the circuit board 7 is disposed above the power switching elements Q1 to Q6. In the present embodiment, the board support portion 64 includes a plurality of protruding portions 641 protruding from the inner bottom surface of the housing body 61, i.e., the surface of the partitioning wall 8 on the inverter housing portion 6 side, and bolt holes into which the above-described first fixing bolts 11 (see FIG. 2) are screwed are each formed in the top surfaces of the plurality of protruding portions 641.

Power Switching Elements Q1 to Q6 and Switching Element Module

Figure 5:
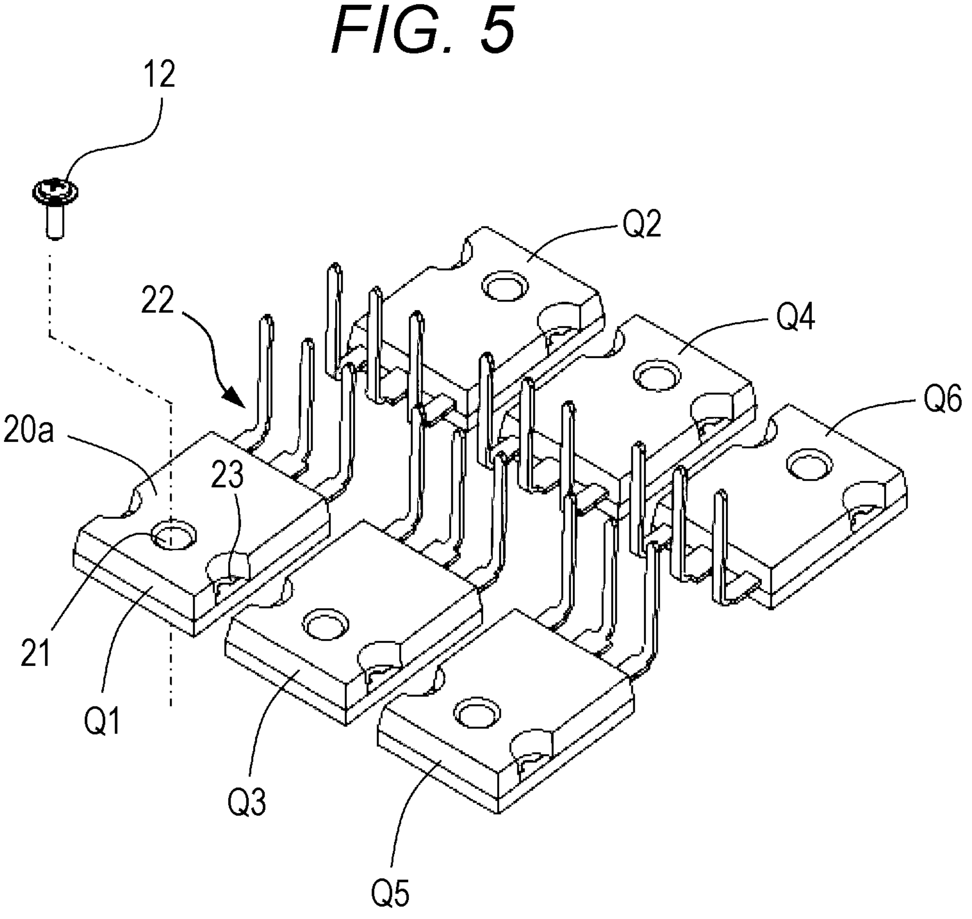
FIG. 5 is a view illustrating a power switching element.
Figure 6:
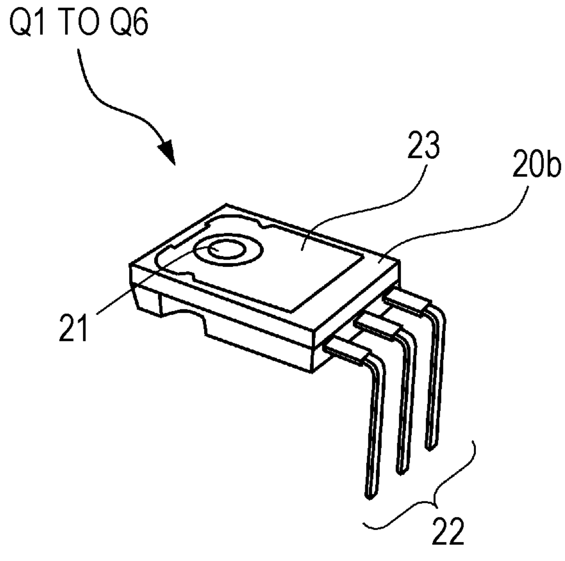
FIG. 6 is a view illustrating the power switching element.

FIGS. 5 and 6 are views illustrating the power switching element. In the present embodiment, each of the power switching elements Q1 to Q6 has an insertion hole (hereinafter referred to as a "first insertion hole") 21 into which the second fixing bolt 12 for fixing the power switching element itself is to be inserted. The first insertion hole 21 penetrates the power switching element from an upper surface 20*a* to a lower surface 20*b*. Note that the second fixing bolt 12 usually has conductivity.

Each of the power switching elements Q1 to Q6 has three terminals 22. In the present embodiment, the three terminals 22 extend laterally from one side surface of the power switching element, are bent in the middle, and face upward at tip ends thereof.

Each of the power switching elements Q1 to Q6 has a die pad 23. Part (specifically, part of both side portions) of the die pad 23 is exposed to both sides of the power switching element.

Further, as illustrated in FIG. 6, in the present embodiment, part (specifically, a lower surface) of the die pad 23 is exposed at the lower surface 20*b* of each of the power switching elements Q1 to Q6.

Note that the die pad 23 can dissipate heat generated from the power switching element, and is made of, for example, metal having thermal conductivity and conductivity.

Figure 7:
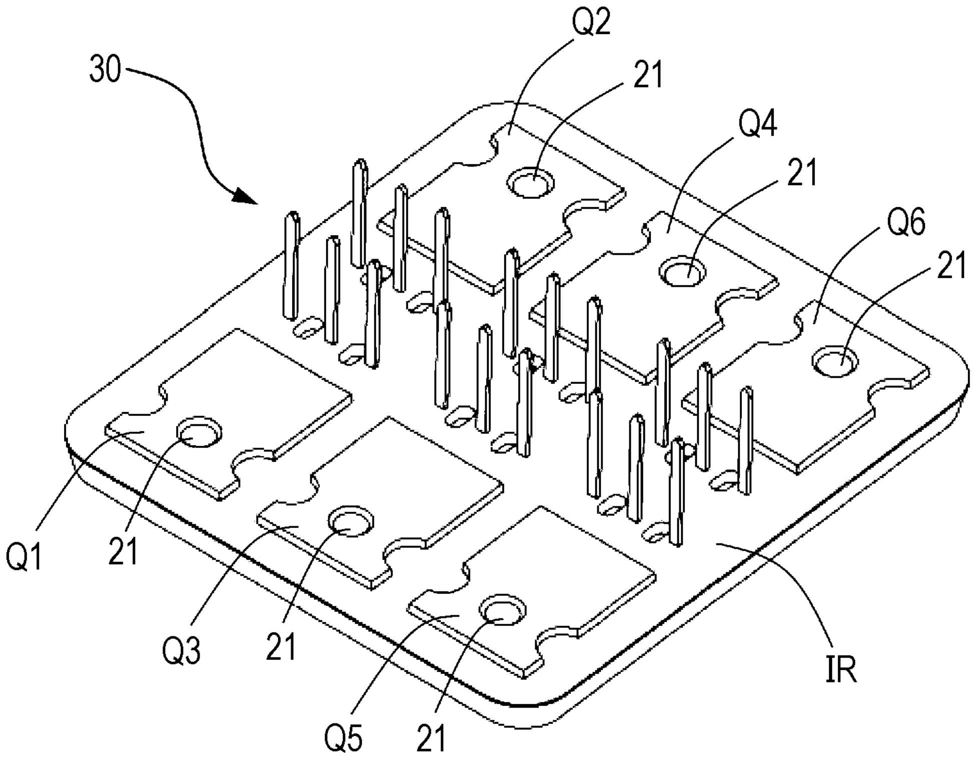
FIG. 7 is a view illustrating a switching element module.

In the present embodiment, as illustrated in FIG. 7, the power switching elements Q1 to Q6 are fixed with thermosetting insulating resin (hereinafter, simply referred to as "insulating resin") IR such as an epoxy resin, i.e., are integrated to form a switching element module 30. Thus, in the present embodiment, the switching element module 30 is installed on the installation portion 63 of the inverter housing portion 6.

Specifically, the power switching elements Q1 to Q6 are integrated using the insulating resin IR (fixed with the insulating resin IR) in a state in which the upper surfaces 20*a* and the lower surfaces 20*b* are exposed and separated from each other, thereby forming the switching element module 30. In other words, in the switching element module 30, most part of all the side surfaces of the power switching elements Q1 to Q6 and base end-side portions of the three terminals 22 of each of the power switching elements Q1 to Q6 are covered with the insulating resin IR.

Moreover, in the switching element module 30, the exposed lower surface 20*b* of each of the power switching elements Q1 to Q6 and the lower surface of the insulating resin IR therearound are flush with each other. That is, the lower surface of the switching element module 30 is flat as a whole.

Here, in the present embodiment, in the switching element module 30, the power switching elements Q1 to Q6 are arranged in two lines. That is, the power switching elements Q1, Q3, Q5 are arranged on one side of the switching element module 30, and the power switching elements Q2, Q4, Q6 are arranged on the other side of the switching element module 30. However, the present invention is not limited thereto, and the arrangement of the power switching elements Q1 to Q6 in the switching element module 30 can be arbitrarily set.

In the present embodiment, in the switching element module 30, most part of all the side surfaces of the power switching elements Q1 to Q6 is covered with the insulating resin IR. However, the present invention is not limited thereto. At least the exposed portions of the die pads 23 at the side portions of the power switching elements Q1 to Q6 and the base end-side portions of the terminals 22 of the power switching elements Q1 to Q6 are only required to be covered with the insulating resin IR, and the area of the side surface of the power switching element covered with the insulating resin IR can be arbitrarily set.

Installation of Switching Element Module 30

Figure 8:
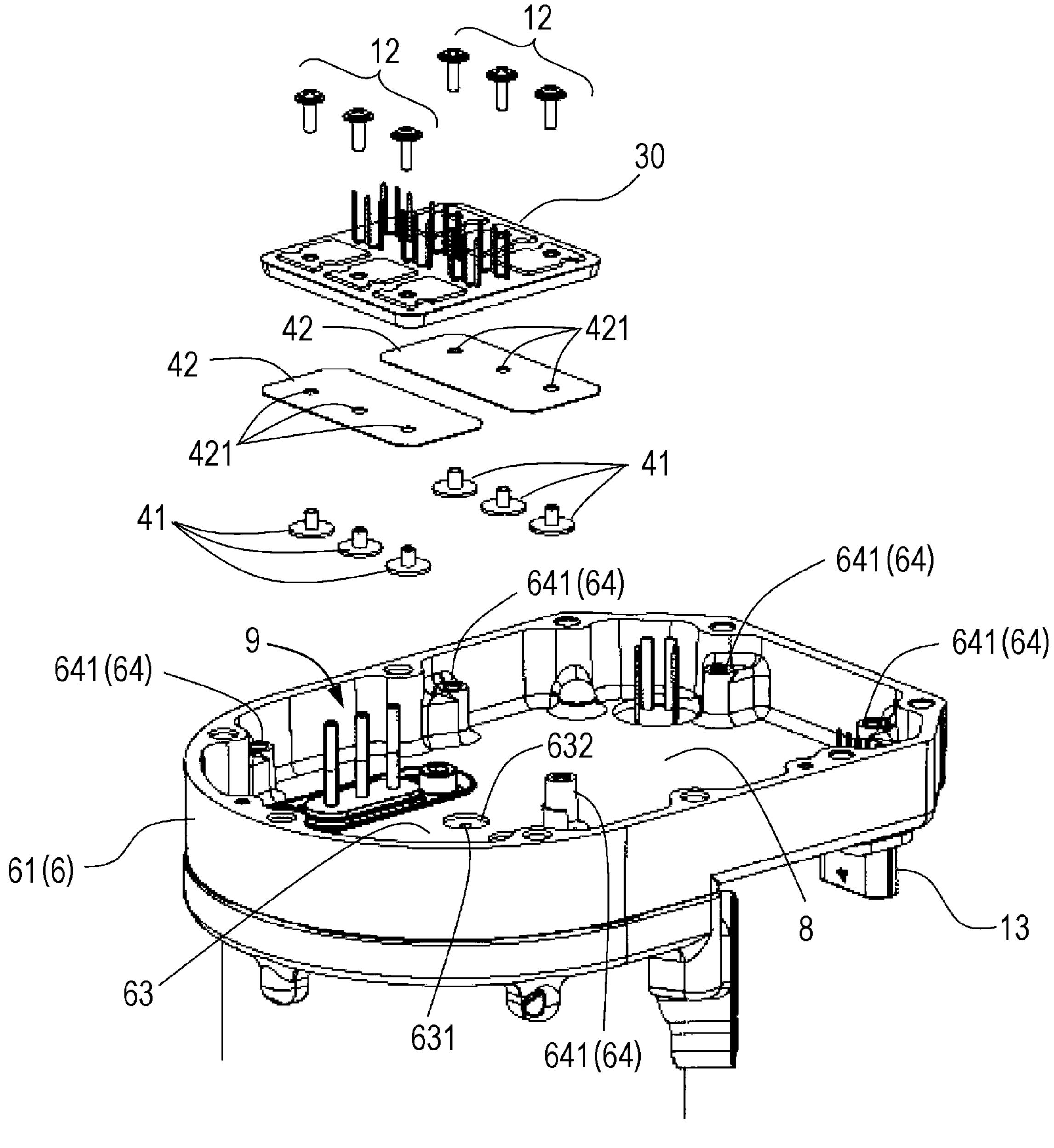
FIG. 8 is a view for describing installation of the switching element module on an installation portion of the inverter housing portion.
Figure 9:
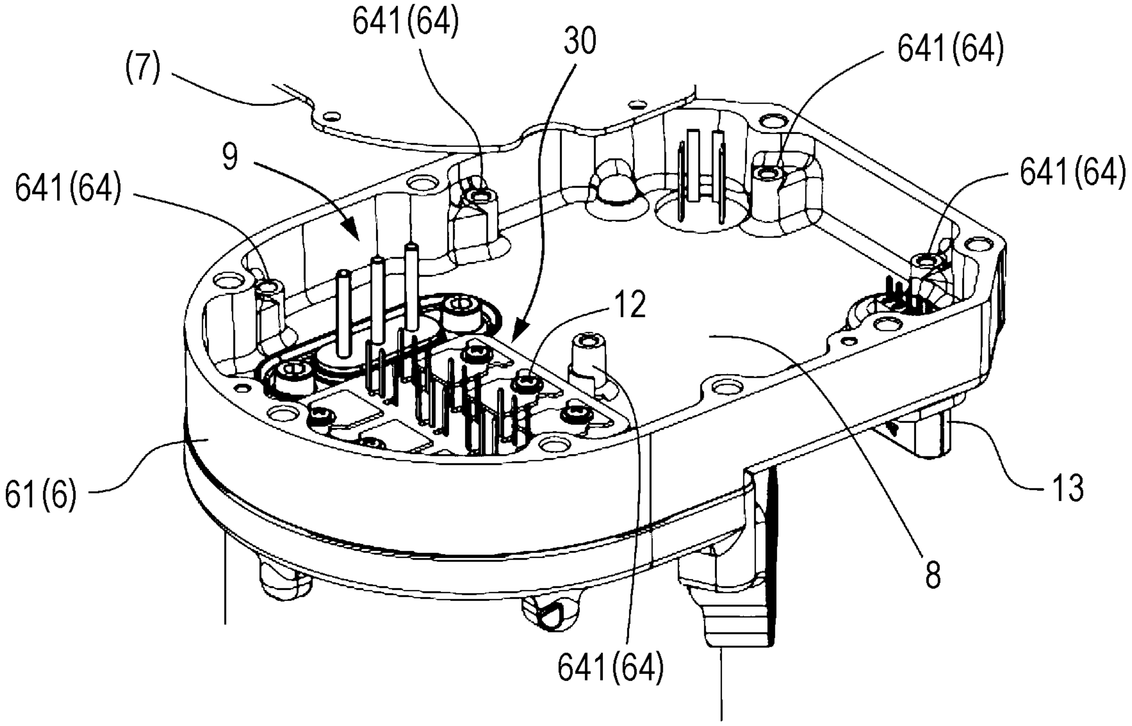
FIG. 9 is a view for describing installation of the switching element module on the installation portion of the inverter housing portion.

FIGS. 8 and 9 are views for describing installation of the switching element module 30 on the installation portion 63 of the inverter housing portion 6. In the present embodiment, the switching element module 30 is installed on the installation portion 63 of the inverter housing portion 6 through the same number of insulating spacers 41 as the number of power switching elements Q1 to Q6 (i.e., six insulating spacers 41) and two insulating sheets 42, and is fixed to the installation portion 63 with the same number of second fixing bolts 12 as the number of power switching elements Q1 to Q6.

Figure 10:
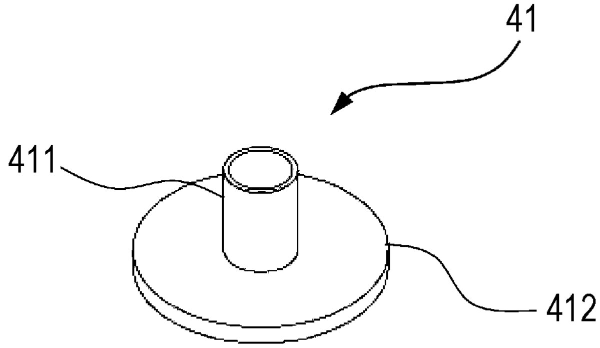
FIG. 10 is a view illustrating an insulating spacer used when the switching element module is installed.

The insulating spacer 41 is made of, for example, insulating resin, and as illustrated in FIG. 10, has a cylindrical portion (insulating cylindrical portion) 411 and a flange portion (insulating flange portion) 412 provided on one end side of the cylindrical portion 411. The cylindrical portion 411 can be inserted into the first insertion hole 21 of each of the power switching elements Q1 to Q6, i.e., has a smaller diameter than that of the first insertion hole 21, and has a length equal to the first insertion hole 21, preferably a length slightly smaller than the length of the first insertion hole 21. The second fixing bolt 12 can be inserted into the cylindrical portion 411. The flange portion 412 can be housed in the counterbore portion 632 formed in the installation portion 63 of the inverter housing portion 6, i.e., has a smaller diameter than that of the counterbore portion 632, and has a thickness equal to the depth of the counterbore portion 632, preferably a thickness slightly smaller than the depth of the counterbore portion 632.

The insulating sheet 42 is made of a material having heat dissipation and insulation, and has a size which can cover the lower surface 20*b* of the power switching element Q1, Q3, Q5 (or Q2, Q4, Q6) of the switching element module 30. In the insulating sheet 42, through-holes 421 into which the cylindrical portions 411 of the insulating spacers 41 can be inserted are formed at positions corresponding to the first insertion holes 21 of the power switching elements Q1, Q3, Q5 (or Q2, Q4, Q6) of the switching element module 30.

The switching element module 30 is installed in the following procedure, for example.

First, the flange portions 412 of the six insulating spacers 41 are arranged in the six counterbore portions 632 formed in the installation portion 63 of the inverter housing portion 6. Thus, the cylindrical portion 411 (i.e., insulating cylindrical portion) of each insulating spacer 41 protrudes from the installation portion 63 (the surface thereof).

Next, two insulating sheets 42 are mounted on the installation portion 63. At this time, the cylindrical portions 411 of the insulating spacers 41 arranged in the counterbore portions 632 are inserted into the through-holes 421 of the insulating sheets 42.

Next, the switching element module 30 is mounted on the two insulating sheets 42. At this time, the cylindrical portions 411 of the insulating spacers 41 arranged in the counterbore portions 632 are inserted into the first insertion holes 21 of the power switching elements of the switching element module 30.

In this manner, the switching element module 30 is mounted on the installation portion 63 of the inverter housing portion 6 through the same number of insulating spacers 41 as the number of power switching elements Q1 to Q6 and the two insulating sheets 42. More specifically, the switching element module 30 is mounted on the installation portion 63 through the two insulating sheets 42 in a state in which the cylindrical portions 411 (i.e., insulating cylindrical portions) of the insulating spacers 41 are each inserted into the first insertion holes 21 of the power switching elements Q1 to Q6.

The two insulating sheets 42 are used here, but one insulating sheet formed by integrating these sheets may be used.

Thereafter, the switching element module 30 is fixed to the installation portion 63 with the same number of second fixing bolts 12 as the number of power switching elements Q1 to Q6. Specifically, the switching element module 30 is fixed to the installation portion 63 in such a manner that the second fixing bolts 12 inserted into the cylindrical portions 411 (insulating cylindrical portions) of the insulating spacers 41 inserted into the first insertion holes 21 of the power switching elements Q1 to Q6 are screwed into the bolt holes 631 formed in the installation portion 63 (see FIG. 9).

Attachment of Circuit Board 7 to Board Support Portion 64

Figure 11:
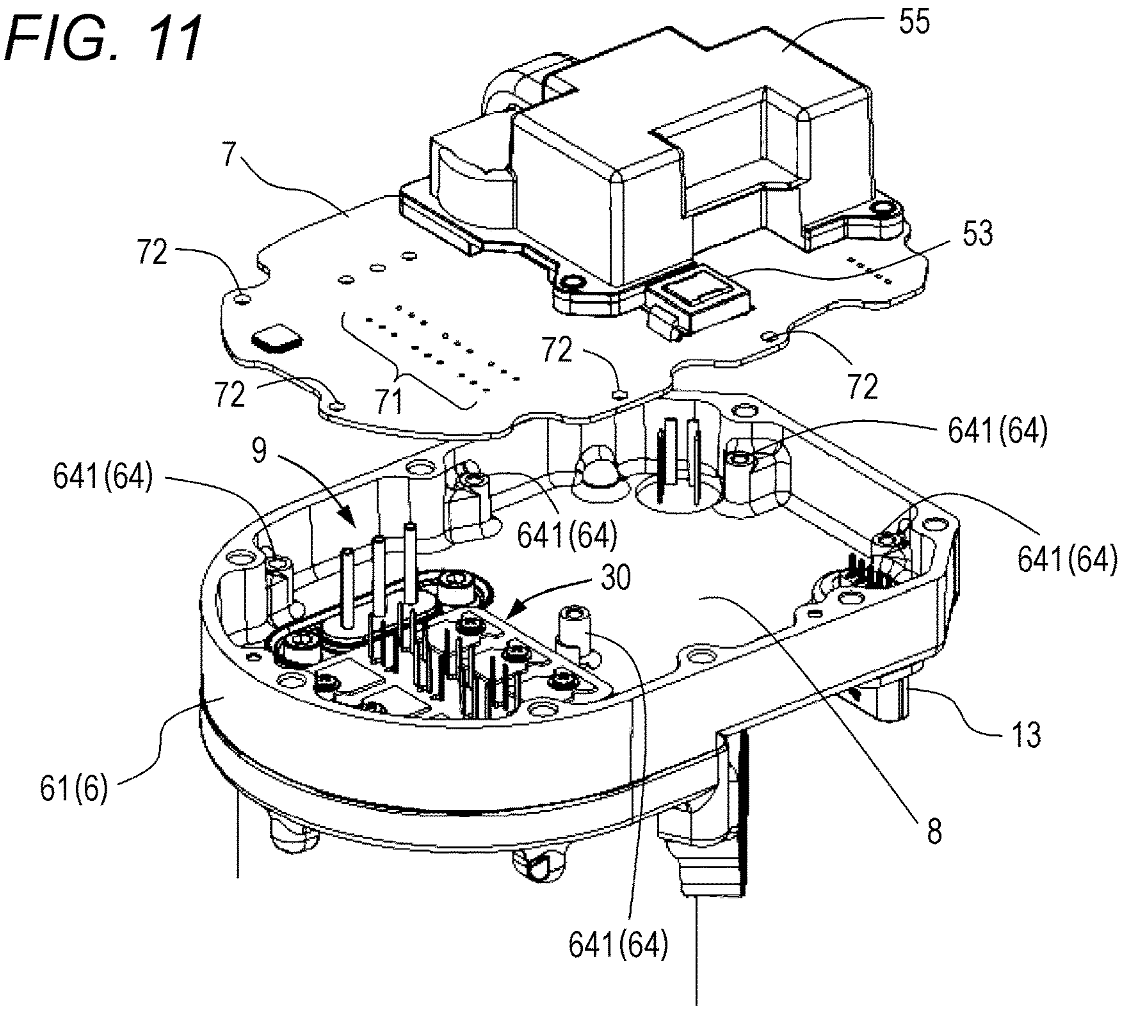
FIG. 11 is a view for describing attachment of a circuit board to a board support portion of the inverter housing portion.
Figure 12:
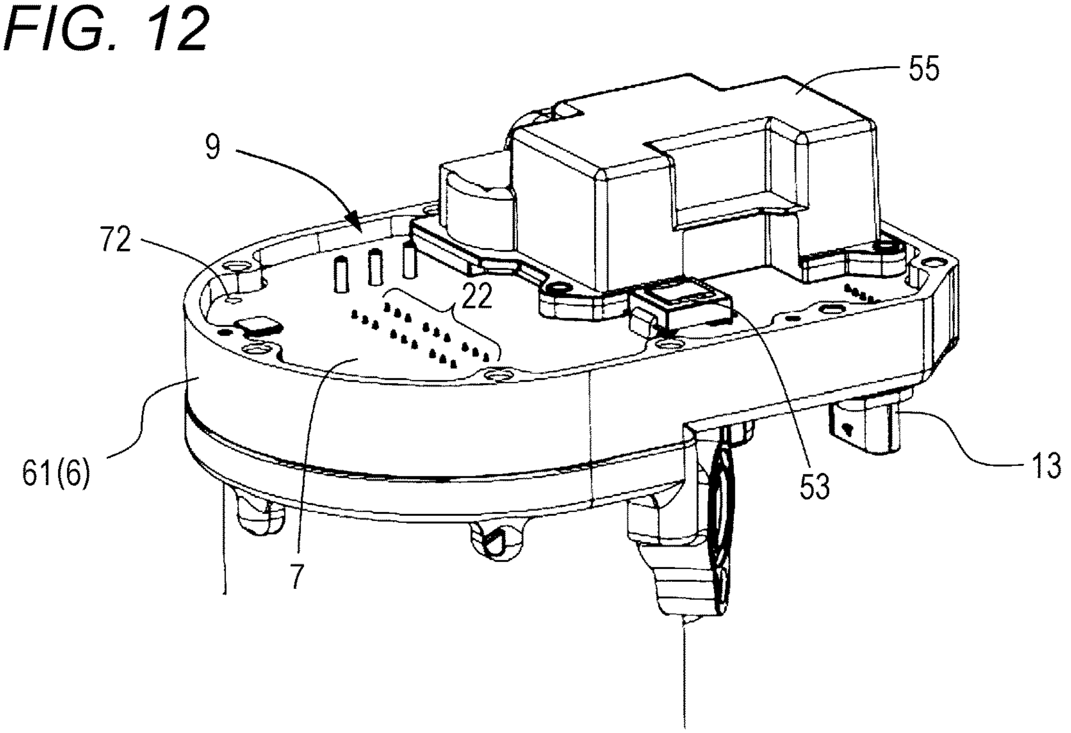
FIG. 12 is a view for describing attachment of the circuit board to the board support portion of the inverter housing portion.

FIGS. 11 and 12 are views for describing attachment of the circuit board 7 to the board support portion 64 of the inverter housing portion 6. In the present embodiment, the circuit board 7 is attached to the board support portion 64 after the switching element module 30 has been installed (fixed) on the installation portion 63.

In the present embodiment, among the electronic components forming the inverter 5, the electronic components other than the power switching elements Q1 to Q6 are mounted on the circuit board 7 in advance. Specifically, in the present embodiment, the smoothing capacitor 51, the diodes D1 to D6, the control circuit 53, and the noise filter 54 are mounted in advance as the other electronic components on the other surface opposite to one surface (hereinafter referred to as a "partitioning wall-side surface") of the circuit board 7 facing the partitioning wall 8 when the circuit board 7 is attached to the board support portion 64. Note that in FIGS. 11 and 12, the diodes D1 to D6 are omitted, and the smoothing capacitor 51 and the noise filter 54 are housed in a filter case 55, are molded and sealed with thermosetting insulating resin, and are mounted on the circuit board 7 in a state of being integrated with the filter case 55.

The circuit board 7 is formed with terminal holes 71 to which the terminals 22 of the power switching elements Q1 to Q6 are connected (inserted). Further, the circuit board 7 is formed with a plurality of insertion holes (hereinafter referred to as "second insertion holes") 72 into which the first fixing bolts 11 can be each inserted. The plurality of second insertion holes 72 is arranged corresponding to the plurality of protruding portions 641 forming the board support portion 64.

As illustrated in FIG. 12, the circuit board 7 is mounted on the board support portion 64 (i.e., the top surfaces of the plurality of protruding portions 641) of the inverter housing portion 6 with the other surface on which the other electronic component are mounted facing up. At this time, the plurality of second insertion holes 72 of the circuit board 7 is arranged on the bolt holes formed in the top surfaces of the plurality of protruding portions 641, the terminals 22 of the power switching elements Q1 to Q6 are each inserted into the terminal holes 71 of the circuit board 7, and the tip end portions thereof protrude from the other surface (surface opposite to the partitioning wall-side surface) of the circuit board 7.

Thereafter, the circuit board 7 mounted on the board support portion 64 (the top surfaces of the plurality of protruding portions 641) is fixed to the board support portion 64 with the plurality of first fixing bolts 11. Specifically, the plurality of first fixing bolts 11 inserted into the plurality of second insertion holes 72 is screwed into the bolt holes formed in the top surfaces of the plurality of protruding portions 641, and in this manner, the circuit board 7 is fixed to the board support portion 64. At this time, the filter case 55 is also fastened to the board support portion 64 with some of the first fixing bolts 11 (see FIG. 2). In addition, the power switching elements Q1 to Q6 are electrically connected to the circuit board 7 in such a manner that the tip end portions of the terminals 22 of the power switching elements Q1 to Q6 are soldered to the circuit board 7.

Note that although detailed description is omitted, the power supply line 9 (or a terminal portion thereof) is also inserted into an insertion hole formed in the circuit board 7, a tip end portion thereof protrudes from the other surface of the circuit board 7, and is electrically connected to the circuit board 7 by, e.g., a not-illustrated connection member. In addition, the circuit board 7 is electrically connected to the external power source VB through a connector 13 when mounted on the board support portion 64.

Attachment of Cover Member 62

After the circuit board 7 has been attached to the board support portion 64 and the above-described electrical connection has been made, the cover member 62 is attached to the housing body 61 through, e.g., a not-illustrated fastening bolt. In this manner, the inverter 5 is housed in the inverter housing portion 6. Note that in the inverter housing portion 6, the other surface (surface opposite to the partitioning wall-side surface) of the circuit board 7 faces the cover member 62, and can also be referred to as a "cover member-side surface". That is, in the present embodiment, the switching element module 30 (power switching elements Q1 to Q6) is provided on the partitioning wall-side surface of the circuit board 7, and the smoothing capacitor 51, the noise filter 54 and the like are provided on the cover member-side surface of the circuit board 7.

The electric compressor 1 according to the present embodiment has the following effects.

The power switching elements Q1 to Q6 are integrated using the insulating resin IR in a state in which the upper surfaces and lower surfaces thereof are exposed, thereby forming the switching element module 30, and the switching element module 30 is installed on the installation portion 63 of the inverter housing portion 6. Thus, the power switching elements Q1 to Q6 can be installed at one time, and the assembly workability of the power switching element is improved as compared to the related art. In addition, each of the power switching elements Q1 to Q6 is surrounded by the insulating resin IR, and therefore, the electric insulation of the power switching element is also improved as compared to the related art. Further, the installation portion 63 is provided on the inverter housing portion 6-side surface of the partitioning wall 8 that separates the inside of the housing 4 and the inside of the inverter housing portion 6 from each other, and the partitioning wall 8 is cooled with the refrigerant (low-temperature low-pressure refrigerant) having flowed into the housing 4. Thus, the heat dissipation (cooling performance) of the power switching elements Q1 to Q6 can also be ensured.

The inverter housing portion 6 includes, in addition to the installation portion 63, the board support portion 64 configured to support the circuit board 7 forming the inverter 5 at the position farther from the partitioning wall 8 than the installation portion 63. That is, when the cover member 62 side of the inverter housing portion 6 is the upper side and the partitioning wall 8 side is the lower side, the circuit board 7 can be supported above the power switching elements Q1 to Q6. Thus, it is possible to reduce the occupied area of the inverter 5 while reducing the influence of the heat generated in the power switching elements Q1 to Q6 on the circuit board 7. Consequently, it is possible to suppress an increase in size of the inverter housing portion 6 and thus the electric compressor 1.

In the switching element module 30, the base end-side portions of the terminals 22 of each power switching elements Q1 to Q6 are covered with the insulating resin IR. Thus, the terminals 22 of the power switching elements Q1 to Q6 are reinforced, and the earthquake resistance of the power switching elements Q1 to Q6 is improved.

In the switching element module 30, the exposed portions of the die pads 23 at the side portions of the power switching elements Q1 to Q6 are covered with the insulating resin IR. Thus, even in a case where voltage applied to the power switching element increases, the power switching element can be stably fixed to the installation portion 63 using the fixing member (having conductivity). Consequently, the earthquake resistance of the power switching elements Q1 to Q6 can be improved.

In the switching element module 30, the lower surface 20*b* of each of the power switching elements Q1 to Q6 and the lower surface of the insulating resin IR are flush with each other. Thus, the switching element module 30 can be stably installed on the installation portion 63, and heat dissipation (cooling) of the power switching elements Q1 to Q6 using the die pads 23 partially exposed (at the lower surfaces) at the lower surfaces 20*b* of the power switching elements Q1 to Q6 can be effectively performed.

The switching element module 30 is mounted on the installation portion 63 through the insulating sheets 42 in a state in which the cylindrical portions 411 (insulating cylindrical portions) of the insulating spacers 41 are inserted into the first insertion holes 21 of the power switching elements Q1 to Q6, and is fixed to the installation portion 63 with the second fixing bolts 12 inserted into the cylindrical portions 411 (insulating cylindrical portions). Here, part (lower surface) of the die pad 23 is exposed at the lower surface 20*b* of each of the power switching elements Q1 to Q6. Thus, even in a case where the voltage applied to the power switching element increases, it is possible to sufficiently cope with this situation, and it is possible to obtain high heat dissipation (cooling performance), high electric insulation, and high earthquake resistance of the power switching elements Q1 to Q6.

Note that in the above-described embodiment, in the switching element module 30, the entirety of the upper surface 20*a* of each of the power switching elements Q1 to Q6 is exposed. However, the present invention is not limited thereto. The upper surface 20*a* of each of the power switching elements Q1 to Q6 is only required to be exposed at least at the first insertion hole 21 and the periphery thereof, and the other portions of the upper surface 20*a* may be covered with the insulating resin IR. That is, at least part of the upper surface 20*a* of each of the power switching elements Q1 to Q6 may be exposed.

Figure 13:
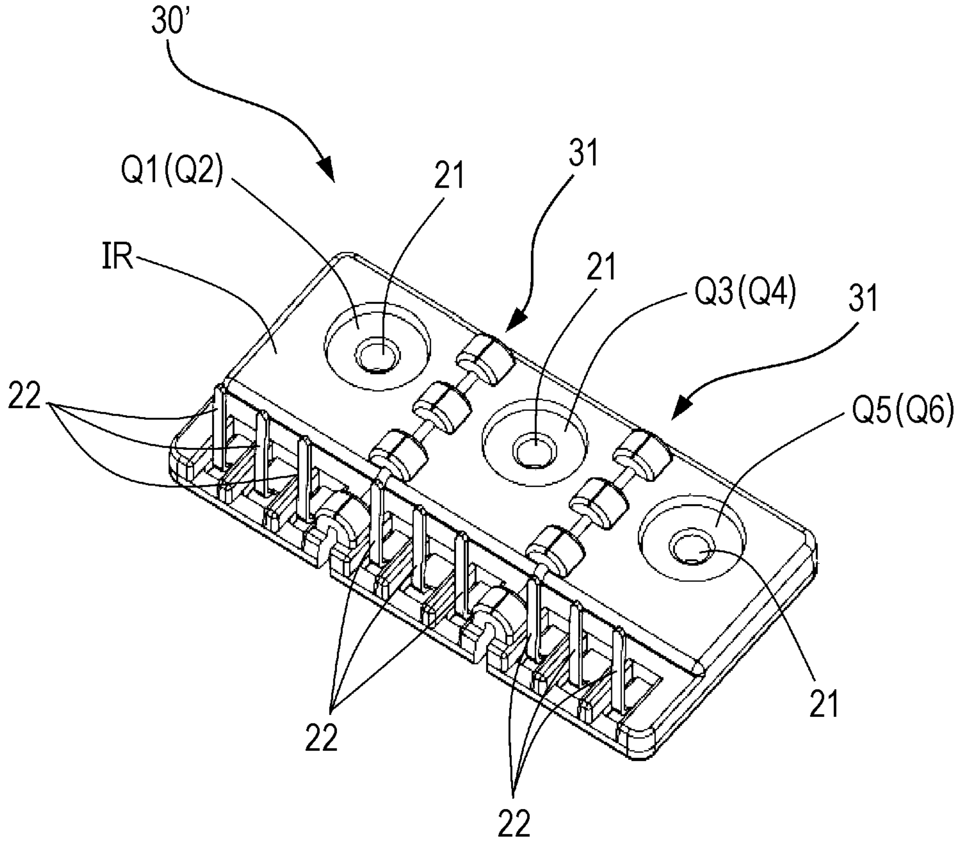
FIGS. 13(*a*) and 13(*b*) are views illustrating a modification of the switching element module, FIG. 13(*a*) being a perspective view and FIG. 13(*b*) being a sectional view.
Figure 13:
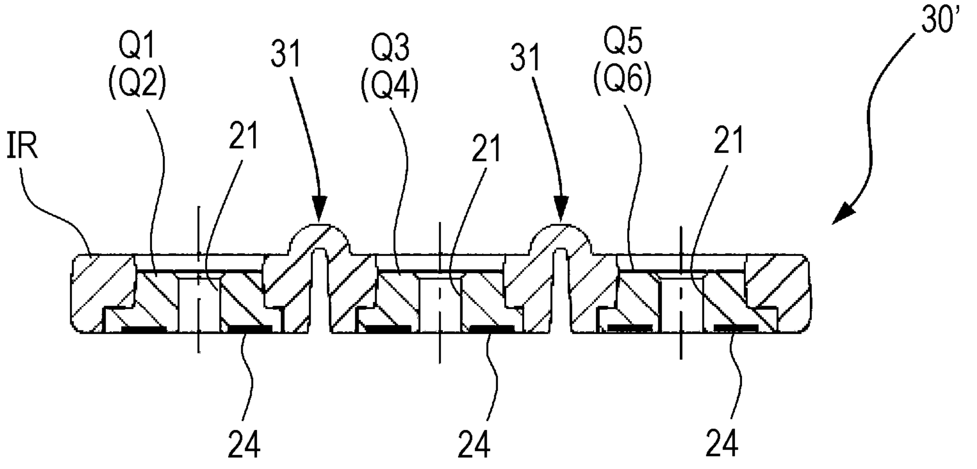

The switching element module is not limited to one having the above-described configuration. For example, as illustrated in FIGS. 13(*a*) and 13(*b*), the six power switching elements Q1 to Q6 may be divided into two to form two switching element modules 30' each of which includes three power switching elements. In this case, in each switching element module 30', each of the three power switching elements Q1, Q3, Q5 (or Q2, Q4, Q6) is individually covered with the insulating resin IR at the side surfaces, the base end-side portions of the terminals 22, and at least part (arbitrary portions other than the first insertion hole 21 and the periphery thereof) of the upper surface.

Adjacent ones of the power switching elements, for example, Q1 and Q3 or Q4 and Q6, are coupled by a deformable coupling portion 31 made of the insulating resin IR, and in this manner, are integrated as the switching element module 30'. The coupling portion 31 is deformed by application of predetermined force or more, thereby expanding or narrowing an interval between the adjacent switching element modules. Note that the shape of the coupling portion 31 and the number of coupling portions 31 can be arbitrarily set.

With this configuration, when the switching element modules 30' are installed on the installation portion 63, for example, the first insertion hole 21 of the power switching element and the bolt hole 631 formed in the installation portion 63 can be easily aligned with each other. Thus, for example, even in a case where the switching element modules 30' vary, the switching element modules 30' can be easily and reliably installed on the installation portion 63, and the assembly workability is further improved.

Up to this point, the embodiment of the present invention and the modifications thereof have been described above. However, the present invention is not limited to the above-described embodiment and modifications, and as a matter of course, can be further modified on the basis of the technical idea of the present invention.

LIST OF REFERENCE SIGNS

1 Electric Compressor
2 Electric Motor
3 Compression Mechanism
4 Housing
5 Inverter
6 Inverter Housing Portion
7 Circuit Board
8 Partitioning wall
21 First Insertion Hole
22 Terminal
23 Die Pad
30, 30' Switching Element Module
31 Coupling Portion
41 Insulating Spacer
411 Cylindrical Portion (Insulating Cylindrical Portion)
42 Insulating Sheet
61 Housing Body
62 Cover Member
63 Installation Portion
64 Board Support Portion
IR Insulating Resin
Q1 to Q6 Power Switching Element

The invention claimed is:

1. An electric compressor comprising:
an electric motor;
a compression mechanism driven by the electric motor to compress refrigerant;
an inverter including a plurality of power switching elements that drives the electric motor;
a housing that houses the compression mechanism and the electric motor; and
an inverter housing portion that houses the inverter,
wherein an inside of the housing and an inside of the inverter housing portion are separated by a partitioning wall,
the inverter housing portion has an installation portion on which the plurality of power switching elements is installed and which is provided on a surface of the partitioning wall on an inverter housing portion side, and
the plurality of power switching elements is integrated using thermosetting insulating resin in a state in which (i) at least part of an upper surface and a lower surface of each power switching element are exposed and (ii) a base end-side portion of a terminal of each of the plurality of power switching elements is covered with the thermosetting insulating resin to form a switching element module, and the switching element module is installed on the installation portion.

2. The electric compressor according to claim 1, wherein the inverter housing portion further has a board support portion that supports a circuit board forming the inverter, and the board support portion is configured to support the circuit board at a position farther from the partitioning wall than the installation portion.

3. The electric compressor according to claim 1, wherein
each of the plurality of power switching elements has an insertion hole into which a fixing member for fixing the power switching element to the installation portion is insertable and which penetrates the power switching element from the upper surface to the lower surface, and
in the switching element module, the insertion hole and a periphery of the insertion hole in the upper surface of each of the plurality of power switching elements are exposed.

4. The electric compressor according to claim 1, wherein
part of a die pad is exposed at a side portion of each of the plurality of power switching elements, and
in the switching element module, the exposed portion of the die pad at the side portion of each of the plurality of power switching elements is covered with the insulating resin.

5. The electric compressor according to claim 1, wherein
in the switching element module, the lower surface of each of the plurality of power switching elements and a lower surface of the insulating resin are flush with each other.

6. The electric compressor according to claim 1, wherein
each of the plurality of power switching elements has an insertion hole into which a conductive fixing member for fixing the power switching element to the installation portion is to be inserted and which penetrates the power switching element from the upper surface to the lower surface,
part of the die pad is exposed at the lower surface of each of the plurality of power switching elements, and
the switching element module is mounted on the installation portion through an insulating sheet with an insulating cylindrical portion inserted into the insertion hole of each of the plurality of power switching elements, and is fixed to the installation portion by the conductive fixing member inserted into the insulating cylindrical portion.

7. The electric compressor according to claim 1, wherein in the switching element module, each of the plurality of power switching elements is individually covered with the insulating resin at part of the upper surface, a side surface, and the base end-side portion of the terminal, and adjacent two of the power switching elements are coupled through a deformable coupling portion made of the insulating resin.

8. The electric compressor according to claim 1, wherein the plurality of power switching elements are integrally fixed to one another by the thermosetting insulating resin.

* * * * *